Jan. 22, 1935.  O. H. TRUMAN  1,988,527
GRAVITY METER
Filed July 29, 1929   2 Sheets-Sheet 2
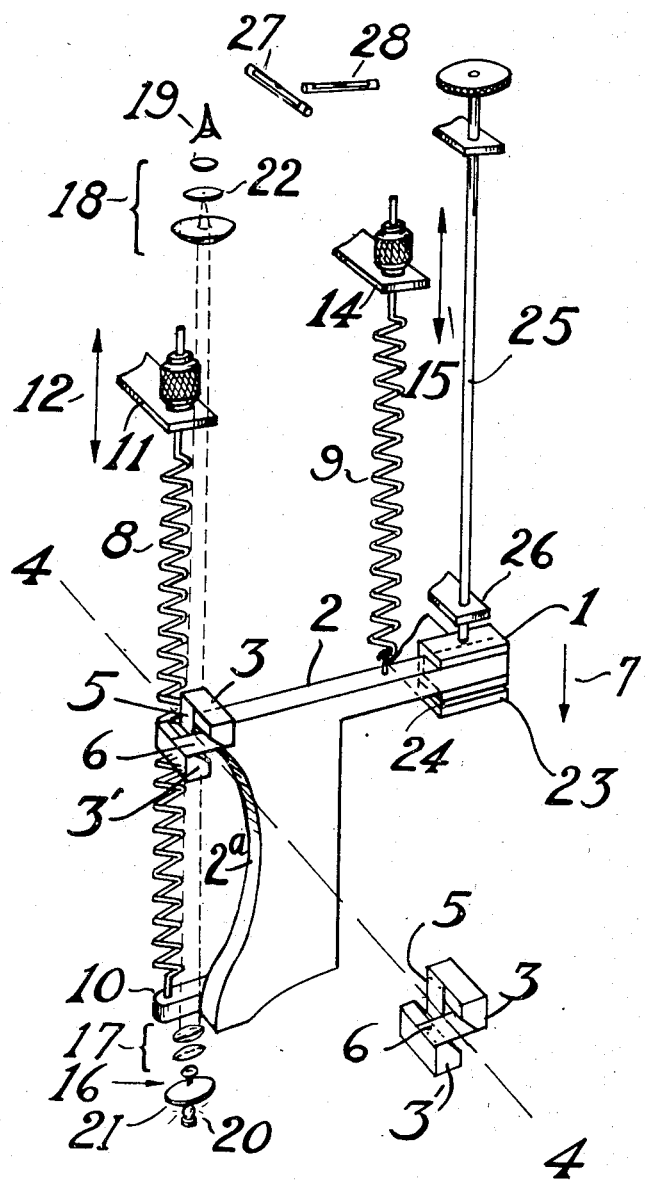

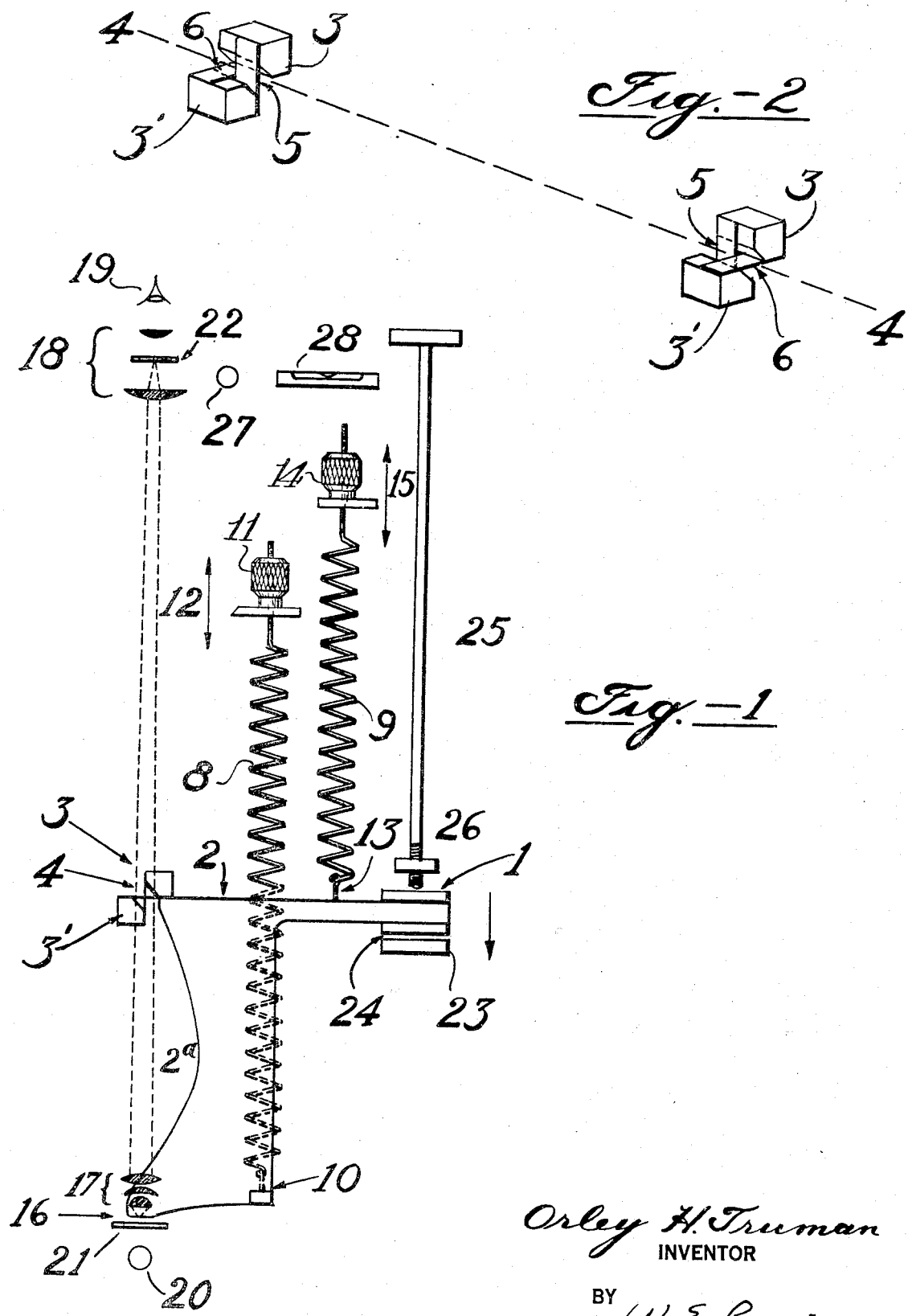

Patented Jan. 22, 1935

1,988,527

UNITED STATES PATENT OFFICE 1,988,527

GRAVITY METER

Orley H. Truman, Houston, Tex., assignor to Standard Oil Development Company, a corporation of Delaware Application July 29, 1929, Serial No. 381,992

5 Claims. (Cl. 265—1)

This invention relates to improvements in gravity meters of the class in which the force of gravity is balanced by a spring or springs and the increase or decrease of the deflection of those springs provides a measure of the force of gravity. A principal object of the invention is to provide a device in which a weight is arranged on a substantially frictionless mounting and is adapted to respond to changes in gravitational attraction. In accordance with this invention, means are provided for permitting the weight to have a long period of oscillation while avoiding positions of unstable equilibrium near the point of stable equilibrium.

The invention will be fully understood from the following description read in connection with the accompanying drawings in which Fig. 1 is a side elevation of the essential parts of the apparatus, the drawings being largely diagrammatic;

Fig. 2 is a perspective view of the crossed spring suspension shown in Fig. 1.

And Fig. 3 is a side elevation of a diagrammatic showing of the essential parts of a modified form of the invention.

It will be understood that the device illustrated will be mounted in a suitable frame and casing and that the parts may be arranged in other manners than that shown. I have here represented them in such positions as to make the drawings most clear, rather than in such positions as they would best be placed in actual construction.

Referring first to Fig. 1, 1 is a mass in the form of a block, which is attached to a beam 2. The beam forms part of or is rigidly mounted on a body 2a which is pivotally supported on a crossed spring suspension, so as to be free to turn through a small angle about an axis 4, perpendicular to the plane of the paper, but to be restrained from any other movement.

The details of this crossed spring suspension are shown in perspective in Fig. 2. In that figure, 4, 4 is the axis above referred to. Two blocks 3, 3 are fixed firmly to the beam 2. Two other blocks 3', 3' are fixed to the frame of the apparatus. Flat vertical springs 5, 5 and flat horizontal springs 6, 6 are fastened to the blocks 3, 3' in a manner which will be obvious from the drawings. Thus blocks 3 are carried by the springs 5 and 6 and have no other point of contact with any fixed member. It will be seen that with this suspension the beam 2 will be able to move as above described and with a total absence of friction.

The mass 1, impelled by the force of gravity, would descend in the direction of arrow 7 if it were not restrained by the two helical springs 8, 9. Spring 8 is attached to beam 2 at a point which is considerably below the axis 4, which is at the same height as the center of gravity of the entire moving system. At its upper end, spring 8 is attached to block 11 which is mounted in the frame in such a way that the spring can be adjusted up and down therein in the direction of arrow 12.

Spring 9 is attached to the beam at a point 13, which will preferably be near the position shown. At its upper end, spring 9 is attached to block 14 which is mounted in the frame so that the spring can be adjusted up and down therein in the direction of arrow 15.

If a moving system, such as above described, is suspended by a single spring 8, it can be adjusted to oscillate about a position of stable equilibrium, and the period of oscillation about this position can be made as long as is desired. But there is a position of unstable equilibrium not far from the position of stable equilibrium, and which approaches the latter more nearly, the longer the period is made. It thereby follows that the above mentioned period only holds good for infinitely small deflections from the position of stable equilibrium, and that the restoring force, instead of being proportional to the deflection, as is required for simple harmonic motion, varies in a complicated way. Because of this, such a moving system, particularly if an attempt is made to make it of long period, becomes unreliable in its performance.

This is remedied by putting on a second spring 9. The position of unstable equilibrium is removed far out of the working range, and the moving system comes under the control of a restoring force proportional to its displacement from its position of stable equilibrium, and capable of being made very small. Thus the period may be pushed very much higher than before, and the performance still kept reliable.

Now it can easily be shown that, if we assume for simplicity that all of the mass of the moving system is concentrated in mass 1, and if:

M is a small increase or decrease in gravitational constant, expressed in cm. per sec.$^2$ P is the period, in seconds;

$x$ is the descent or ascent of mass 1, in cm.; then $$x = \left(\frac{P}{2\pi}\right)^2 M$$

It is thus to be seen that by increasing P, the deflection of mass 1 for a certain value of M may be rapidly increased.

If M is 0.0001 cm. per sec.$^2$, which is a change of gravity of about one ten millionth part, and P is 4.4 seconds, which can be easily attained, then $x$ will be 0.00005 cm.

To the beam 2 is attached a marker or target 16, which is preferably a thin piece of glass with a very fine scratch upon it. As mass 1 ascends or descends this target will move to and fro an amount dependent upon the ratio of the distance from 4 to 16 to the distance from 4 to 1. The motion of mass 1 may thus be somewhat multiplied, and conveniently in the ratio of 2 to 1. Assuming this, for the sake of illustration, the target 16 would in the above case move through 0.0001 cm.

The target 16 is viewed by a compound microscope, of which 17 is the objective, and 18 is the ocular. The eye is placed at 19.

At the time of observation, the target 16 is illuminated by any suitable means. I have found a small electric lamp 20, and ground glass 21, to be very good. The lamp must not be turned on except when needed, lest its heat disturb the apparatus. In the focal plane of ocular 18 is a scale or micrometer 22, by which the deflection of target 16 is read. I have found that by using a microscope and scale of standard quality the above supposed deflection of 0.0001 cm. can be detected easily.

It is therefore to be seen that the above apparatus, provided its parts are sufficiently reliable, will detect a change in gravity of one ten millionth part.

To bring the moving system to rest, and prevent it from wandering about due to disturbances, some means of damping is desirable. A preferable means is a block 23, fixed to the frame, and placed very close to the mass 1. The friction of the air moving in and out of the small space 24 will provide the damping force required.

When the apparatus is not in use the mass 1 is to be clamped by a clamping device, such as screw 25 working in fixed nut 26.

This whole apparatus is inclosed in a suitable case, which is put inside a larger case, so as to leave a considerable space between them. This space is maintained at a temperature as nearly constant as possible, by any of the means well known for such purposes. The outermost case should be well insulated against heat loss. The space inside the inner case is thereby maintained at a very uniform temperature, which is highly essential, because of the disturbing effects which would arise from heating and cooling, and from the temperature of the apparatus not being the same in all its parts.

In order to secure a true reading of the force of gravity, the apparatus must be brought into the same relation to the vertical at all times. This is secured in the well known way, by the two spirit levels at right angles to each other, 27 and 28.

Realization of the above described type of equilibrium depends upon proper choice of the lengths of springs 8 and 9. These lengths are computed approximately, and bettered by experiment, this being facilitated by the adjustment up and down of the blocks 11 and 14.

In addition, by finely adjusting either of these blocks, the zero point of the apparatus may be set as desired.

It will be understood by those familiar with the theory of this suspended system that the placing and proportions of springs 8 and 9 may be varied in innumerable ways without departing from the spirit of this invention; and I claim all these ways as part of the invention. The center line of spring 8 may, for instance, be moved to the left until it intersects the axis 4, 4 as shown in Fig. 3: a plan which has advantages in simplifying the theory. In that case, the entire weight of mass 1 is carried by spring 9; and spring 8 serves merely to control the state of equilibrium. The device is otherwise the same as the device illustrated in Fig. 1 and like reference numerals have been applied to like parts.

Also, the apparatus being otherwise substantially similar to Fig. 1, spring 9 and associated parts may be omitted altogether. This will have the disadvantage of introducing the relatively undesirable kind of equilibrium first described above; but this will be permissible in some cases where the greatest perfection is not required. Spring 9 may therefore be omitted without departing from this invention.

I am aware that devices bearing some resemblance to this have been constructed and used for the wholly different purpose of recording earthquake vibrations, and I do not claim herein the principle broadly. The present invention resides in specific improvements and modifications, and in the use of this modified apparatus for measuring the force of gravity. Various changes and alternative arrangements may be made within the scope of the appended claims, in which it is my intention to claim all novelty inherent in the invention as broadly as the prior art permits.

I claim:

1. A gravity measuring device comprising a weighted beam, a suspension for one end of the beam permitting free pivotal movement of the beam about a fixed axis in only a vertical direction, and means for normally balancing the other end of the beam against the force of gravity comprising a helical spring secured to the beam below said suspension and partially supporting the beam to oscillate about a position of equilibrium at a predetermined period whereby variations in the force of gravity on the beam vary the deflection of the beam, and means for reading the deflection of the beam.

2. A gravity measuring device comprising a weighted beam, a suspension for one end of the beam permitting free pivotal movement of the beam only about a fixed horizontal axis, and means for normally balancing the other end of the beam against the force of gravity comprising a helical spring secured to the beam intermediate its ends suspending the beam for oscillation about a position of equilibrium and controlling the period of oscillation of the beam, and a second helical spring partially suspending the beam adjacent the free end of the beam so that the position of unstable equilibrium is removed from the working range of oscillation of the beam whereby variations in the force of gravity on the beam vary the deflection of the springs.

3. A gravity measuring device according to claim 2 in which the suspension for one end of the beam permitting free pivotal movement of the beam only about a fixed horizontal axis is a spring suspension.

4. A gravity measuring device comprising a weighted beam, a suspension for one end of the beam permitting free pivotal movement of the beam about a fixed axis in only a vertical direction, and means for normally balancing the other end of the beam against the force of gravity comprising a helical spring secured to the beam intermediate the ends of the beam and below said suspension and partially supporting the beam to oscillate about a position of equilibrium at a predetermined period, and a second helical spring partially suspending the beam adjacent the free end of the beam so that the position of unstable equilibrium is removed from the working range of oscillation of the beam whereby variations in the force of gravity on the beam vary the deflection of the springs.

5. A gravity measuring device comprising a weighted beam, a suspension for one end of the beam permitting free pivotal movement of the beam about a fixed horizontal axis in only a vertical direction, and means for normally balancing the other end of the beam against the force of gravity comprising a helical spring suspending the beam adjacent the free end of the beam, and a helical spring secured to the beam beneath the axis suspending the beam for oscillation about a position of equilibrium and controlling the period of oscillation of the beam, the axis of said spring being vertical and passing through the pivotal axis of the beam when the beam is in its zero position.

ORLEY H. TRUMAN.